(12) United States Patent  (10) Patent No.: US 7,779,574 B1
Miller et al.  (45) Date of Patent: Aug. 24, 2010

(54) MOLE TRAP

(76) Inventors: James W. Miller, 4738 Gateway Cir., Dayton, OH (US) 45440; Scott W. Miller, 4738 Gateway Cir., Dayton, OH (US) 45440

( * ) Notice: Subject to any disclaimer, the term of this patent is extended or adjusted under 35 U.S.C. 154(b) by 218 days.

(21) Appl. No.: 11/904,213

(22) Filed: Sep. 26, 2007

Related U.S. Application Data

(60) Provisional application No. 60/848,175, filed on Oct. 2, 2006.

(51) Int. Cl.
*A01M 23/30* (2006.01)

(52) U.S. Cl. ................... 43/78; 43/79; 43/80; 43/97

(58) Field of Classification Search ............ 43/78, 43/79, 80, 97
See application file for complete search history.

(56) References Cited

U.S. PATENT DOCUMENTS

| | | | | |
|---|---|---|---|---|
| 566,912 A * | 9/1896 | Jones | | 43/80 |
| 689,324 A | 12/1901 | Rittenhouse et al. | | |
| 834,495 A * | 10/1906 | Sandefur | | 43/79 |
| 861,174 A * | 7/1907 | Heil | | 43/80 |
| 1,330,622 A * | 2/1920 | Corsaw | | 43/80 |
| 1,382,125 A * | 6/1921 | Schroeter | | 43/80 |
| 1,583,679 A * | 5/1926 | Elkins | | 43/78 |
| 1,584,677 A * | 5/1926 | Stacy | | 43/78 |
| 1,626,903 A * | 5/1927 | Wyman | | 43/80 |
| 2,009,635 A * | 7/1935 | Remlinger | | 43/80 |
| 2,086,826 A | 7/1937 | Smith | | |
| 2,475,467 A * | 7/1949 | Alvan | | 43/80 |
| 2,778,148 A * | 1/1957 | Schmidt | | 43/80 |
| 3,013,358 A * | 12/1961 | Wilken | | 43/80 |
| 4,429,485 A * | 2/1984 | Dubray | | 43/97 |
| 4,494,335 A * | 1/1985 | Gaines | | 43/80 |
| 4,776,128 A * | 10/1988 | Townsend | | 43/80 |
| 5,191,733 A * | 3/1993 | Withrow | | 43/124 |
| 2007/0068065 A1 * | 3/2007 | Brown, Jr. | | 43/80 |

* cited by examiner

*Primary Examiner*—Christopher P Ellis
(74) *Attorney, Agent, or Firm*—Jacox, Meckstroth & Jenkins

(57) ABSTRACT

A mole trap includes a steel rod frame having parallel spaced legs adapted to penetrate the ground on opposite sides of a mole hill or tunnel. The legs are integrally connected by a handle portion and also by a stop bar, and a spike plate having depending spikes is preloaded against the stop bar by compression springs mounted on the legs. An L-shaped latch lever is pivotally supported by the stop bar and supports a trip plate adapted to contact the ground where the mole tunnel has been depressed. The spike plate and spikes are retracted upwardly against the springs to a set position by pulling a flexible strap extending from the handle portion around a roller supported by the spike plate for rotation on an eccentric axis to provide a mechanical advantage. A roller on the latch lever automatically blocks the spike plate when elevated to the set position.

16 Claims, 3 Drawing Sheets

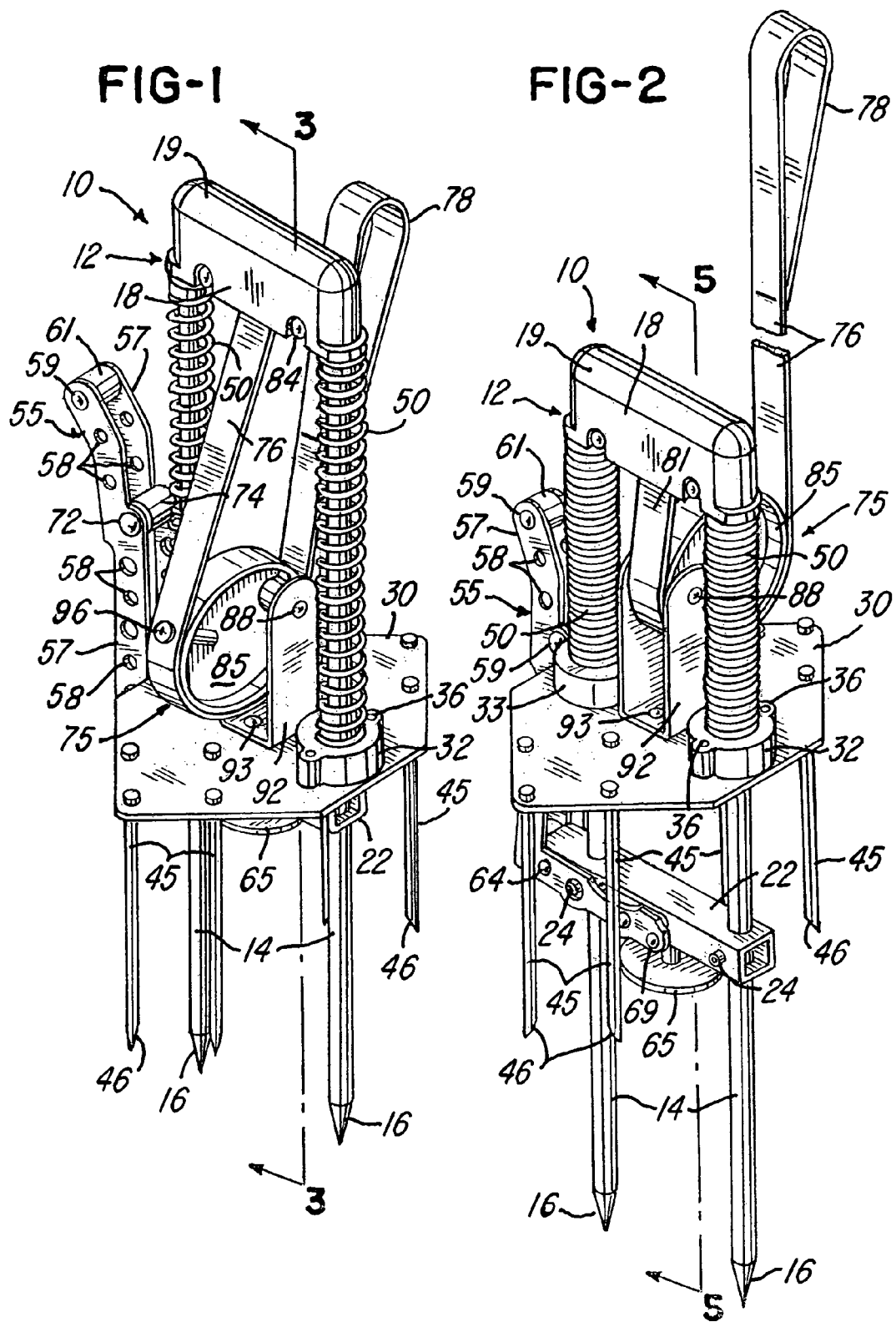

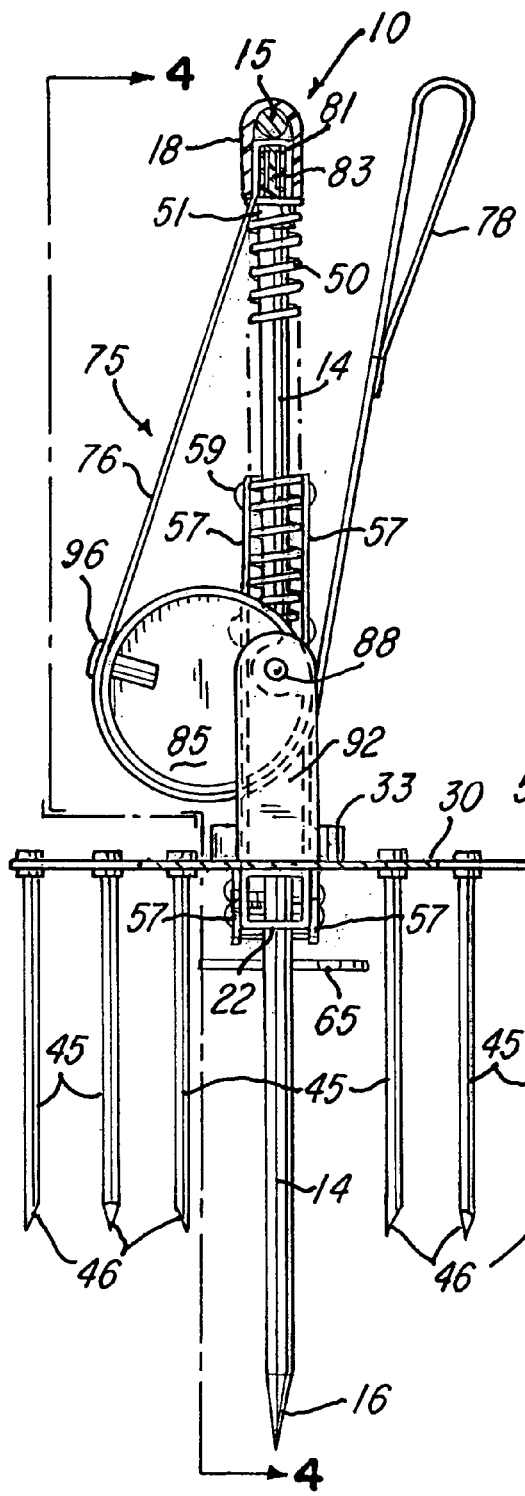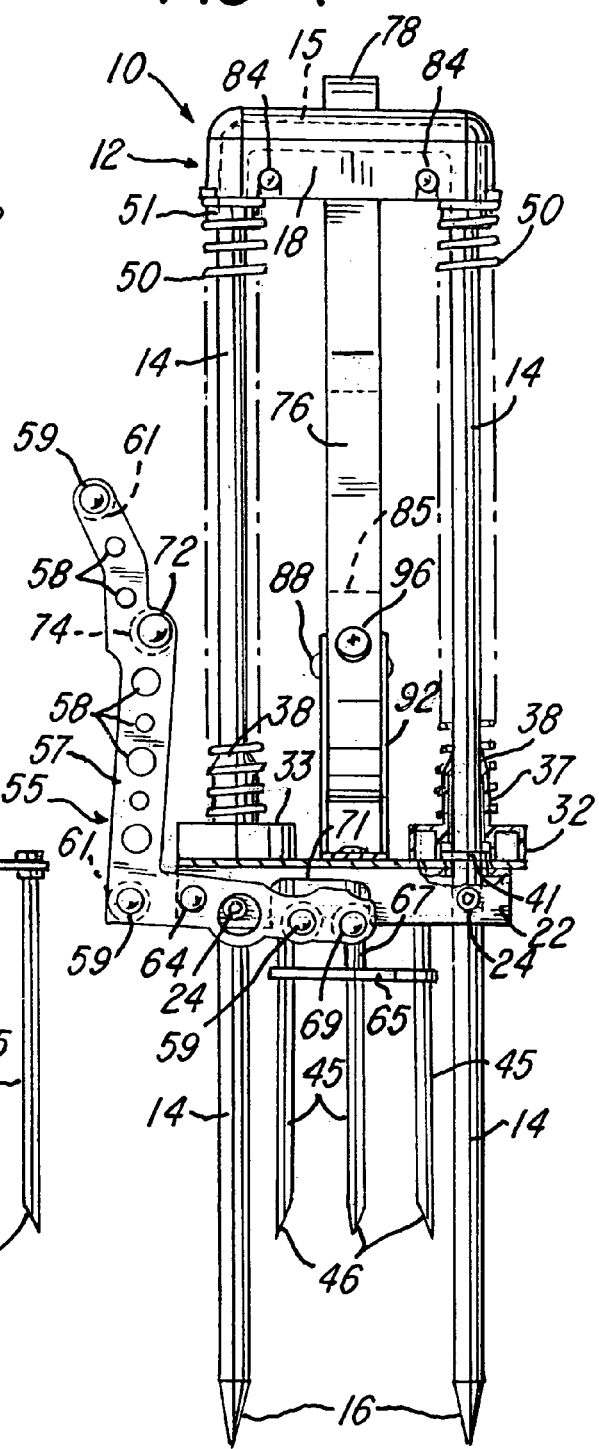

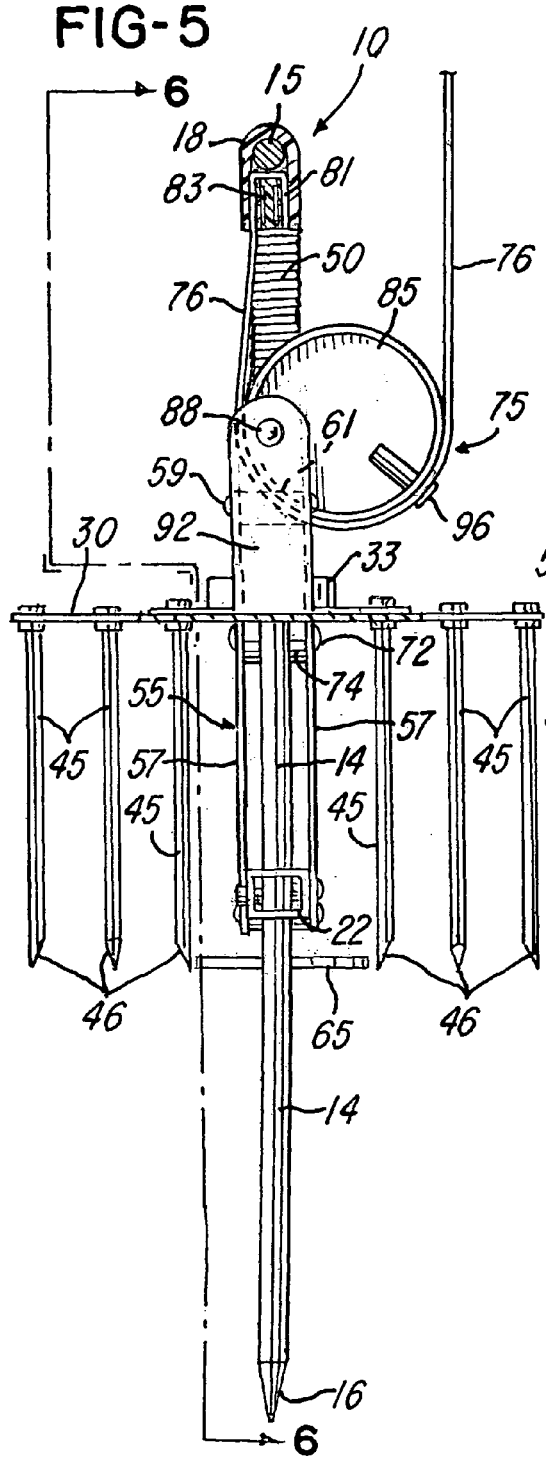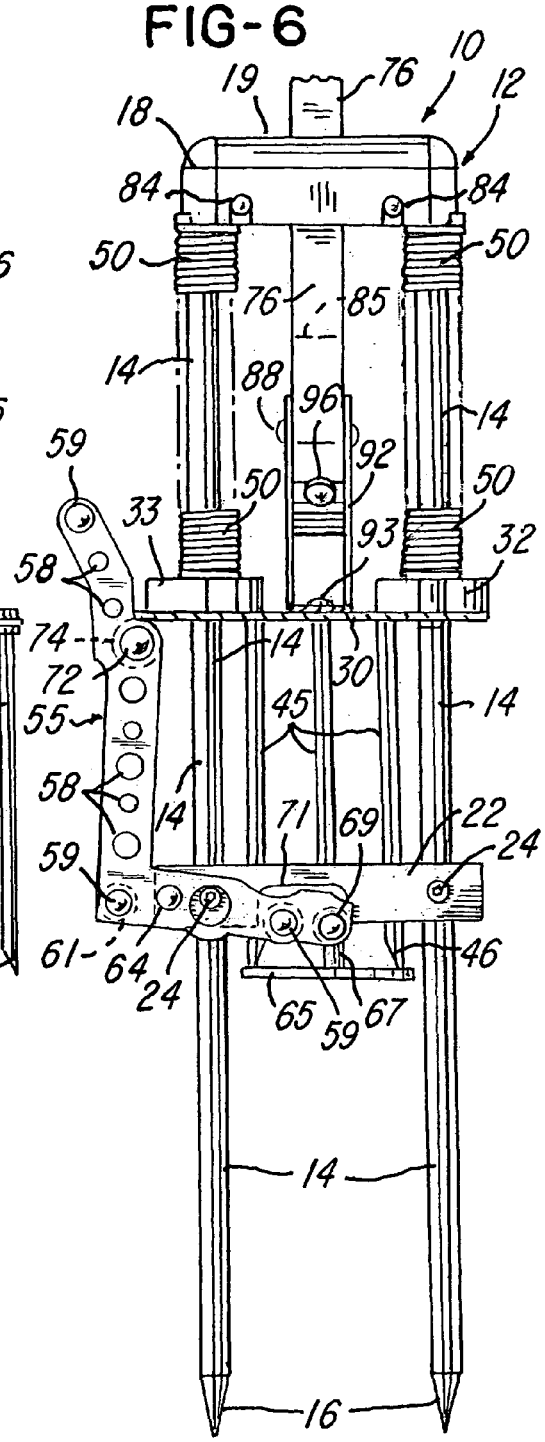

MOLE TRAP

BACKGROUND OF THE INVENTION

The present invention relates to mole traps of the general type disclosed in expired U.S. Pat. No. 689,324, No. 1,330,622, No. 1,382,125, No. 2,086,826 and No. 3,013,358. As disclosed in these patents, an inverted U-shaped frame is formed from strap metal and has parallel spaced legs adapted to penetrate the ground. The legs support a spike plate having a plurality of parallel spaced spikes for movement between a lower extended position and an upper set position where the spike plate is temporarily retained by a latch member having a lower end engaging a trip lever pivotally supported by one of the legs. The spike plate and spikes are pulled upwardly to the set position by a metal hand strap which is surrounded by a coil spring urging the spike plate and spikes downwardly on the legs.

In a mole trap such as disclosed in the above-mentioned patents, it has been found desirable to have a number of steel spikes which are driven into the ground quickly and with substantial strike force. Such force is also sometimes necessary when the ground around the mole trap dries and hardens, in order for the spikes to penetrate fully into the ground for trapping the mole. However, in order to increase the strike force and have the spikes move more quickly, it is necessary to use a stronger compression or tension spring which significantly increases the hand pulling force required to set the trap. It has also been found desirable to have a trigger and release mechanism which is sensitive to any disturbance or movement of the ground under the mole trap after the trap is set. In addition, the mole trap should be durable to provide for many years of service and be easy to use and to set the trap with a light pulling force.

SUMMARY OF THE INVENTION

The present invention is directed to an improved mole trap which provides all of the desirable features and advantages mentioned above and which will also remain in the ground when the spikes are driven into the ground. In accordance with the illustrated embodiment of the invention, a mole trap includes an inverted U-shaped frame having parallel spaced legs adapted to penetrate the ground, and a spike plate is supported by the legs for linear movement between an upper set position and a lower release position. A plurality of parallel spaced elongated spikes have upper end portions secured to the spike plate and project downwardly parallel to the legs. A compression spring surrounds each of the legs for urging the spike plate and spikes downwardly towards the release position, and a pivotal latch and trip lever secures the spike plate and spikes in the set position. A hand operated cocking mechanism connects the frame to the spike plate and is operable between the springs to move the spike plate from the release position to the set position compressing the springs with a hand force substantially less than the force exerted by the springs on the spike plate.

Other features and advantages of the invention will be apparent from the following description, the accompanying drawings and the appended claims.

BRIEF DESCRIPTION OF THE DRAWINGS

FIG. 1 is a perspective view of a mole trap constructed in accordance with the invention and shown in its normal released position;

FIG. 2 is a perspective view similar to FIG. 1 and showing the mole trap in its set position;

FIG. 3 is a section of the mole trap, taken generally on the line 3-3 of FIG. 1;

FIG. 4 is an elevation view, in part section, of the mole trap, taken generally on the line 4-4 of FIG. 3;

FIG. 5 is a section similar to FIG. 3 of the mole trap in its set position, taken generally on the line 5-5 of FIG. 2; and FIG. 6 is a view similar to FIG. 4 and showing the mole trap in its set position.

DESCRIPTION OF THE ILLUSTRATED EMBODIMENT

FIG. 1 shows a mole trap 10 constructed in accordance with the invention and which includes a rigid frame 12 formed by an inverted U-shaped steel rod having a pair of elongated parallel spaced legs 14 each having a pointed bottom end surface 16. The vertical legs 14 are integrally connected by a horizontal handle portion 15 which projects into a handle cover member 18 molded of a rigid plastics material. The handle cover member 18 has a rounded upper surface 19 to facilitate pressing the legs 14 into the ground. The legs 14 are also rigidly connected by tubular tie bar or stop member 22 secured to the legs 14 by Allen screws 24 which provide for adjusting the tie bar or stop member 22 vertically on the legs 14.

A flat sheet metal spike plate 30 carries a set of tubular molded plastic guide bushings 32 and 33, and the guide bushing 32 is secured to the spike plate 30 by a pair of screws extending upwardly through the spike plate and into holes 36 formed within the guide bushing. The bushing 33 seats on the plate 30, but is not attached, and each of the bushings 32 and 33 have a tubular portion 37 with frusto-conical or tapered upper end surface 38 (FIG. 4) for scraping the upper portions of the legs 14 when the spike plate 30 moves vertically on the legs 14. The tubular portions 37 of the bushings 32 and 33 also have axially extending and circumferentially spaced internal ribs which are molded as part of the bushings and contact the legs 14. The bottom portion of each bushing 32 and 33 also has a cavity which receives a split plastic washer 41 for also cleaning the upper portion of the legs 14 as the spike plate 30 travels vertically on the legs.

A plurality of eight elongated cylindrical steel spikes 45 have pointed bottom end surfaces 46 and upper end portions riveted to the spike plate 30. As shown, four spikes 45 are supported by each end portion of the spike plate 30 and are arranged in a diamond pattern with four spikes 45 extending in a vertical center plane of the mole trap 10. A pair of heavy duty compression springs 50 are mounted on and surround the upper portions of the legs 14 and are positioned concentrically with the legs by downwardly projecting tubular portions 51 on the handle cover member 18 and the upwardly projecting tubular portions 37 of the bushings 32 and 33. The extended springs 50 exert a light preload force on the spike plate 30 in its normal released position (FIGS. 1, 3 and 4) where the spike plate 30 seats on the stop bar or member 22.

An L-shaped latch lever 55 includes parallel spaced L-shaped side plates 57 each having a series of holes 58, and the plates 57 are rigidly connected by three rivets 59 (FIG. 4) which extend through corresponding plastic spacer tubes 61. The latch lever 55 is pivotally supported for tilting movement by a rivet 64 which extends through aligned holes within the side plates 57 and within one end portion of the tubular stop bar or member 22. The inner end portion of the lever 55 supports a pivotally connected trip member or circular plate 65 riveted to the bottom end portion of a stem 67 having an upper end portion with a cross hole receiving a rivet 69 to provide for free pivotal movement of the trip plate 65. The bottom center portion of the stop member 22 has a notch or recess 71 for receiving the rivet 69 and the upper end portion of the stem 67. As shown in FIGS. 4 and 6, the upper end portions of the side plates 57 of the latch lever 55 are connected by a rivet 72 which supports a freely rotating latch roller 74 between the side plates 57.

The spike plate 30 and the depending spikes 45 are moved from the released position (FIGS. 1, 3 and 4) seated on the bar 22 to a cocked or set position (FIGS. 2, 5 and 6) by a cocking mechanism 75. The mechanism includes a flexible reinforced fabric strap 76 having one end portion forming a hand loop 78 and an opposite end portion 81 (FIGS. 3 and 5) wrapped around a plastic insert or plug 83 pressed into a cavity formed within the bottom of the handle cover member 18 and secured by a pair of rivets 84. The plug 83 has laterally projecting pointed prongs to aid in gripping the end portion of the strap 76. As shown in FIGS. 1-6, the flexible strap 76 extends around a cylindrical roller or spool 85 which is molded of a rigid plastics material and is supported for rotation on an eccentric axis of a rivet 88 extending through the upper end portions of a U-shaped bracket 92. The bracket is secured by rivets 93 to the top surface of the spike plate 30. A screw 96 secures an intermediate portion of the strap 76 to the outer cylindrical surface of the roller or spool 85 to prevent slippage and assure that the spool rolls on the strap 76.

In use and operation of the mole trap 10, the mole hill or tunnel is depressed downwardly until the top of the mole hill or tunnel is generally flush with the ground. The legs 14 and the spikes 45 of the mole trap are then pressed into the ground with the use of the handle cover member 18 and with the legs 14 positioned on opposite sides of the mole hill or tunnel. If the spikes 45 do not fully enter into the ground, the mole trap may be cocked and fired once or twice so that the spikes 45 form corresponding entrance holes in the ground, and the spike plate 30 seats on the stop bar 22. The cocking or setting of the mole trap is performed simply by pulling up on the strap 76 using the hand loop 78 while holding down on the handle cover member 18. When the spike plate 30 is raised to its set position, the latch lever 55 automatically tilts or pivots inwardly until the roller 74 is under the spike plate 30, as shown in FIG. 6. The weight of the lower leg of the latch lever 55 and the trip plate 65 is sufficient to bias the roller 74 so that it automatically rolls under the spike plate 30 when the spike plate is retracted to its upper set position.

As shown in FIGS. 3 and 5, as the spike plate 30 moves upwardly in response to pulling the hand loop 78 of the strap 76, the force exerted by the springs 50 progressively increases. However, the mechanical advantage provided by the eccentrically supported roller or spool 85 progressively increases so that the hand pulling force on the strap becomes progressively less than the force exerted by the springs 50. This permits the use of high force compression springs 50 while substantially reducing the pulling force required to set the mole trap. As apparent from FIG. 6, only a slight upward movement of the trip plate 65 is required to tilt the lever 55 and move the axis of the roller 74 pass the edge of the spike plate 30 to release the plate for firing the spikes 45 into the ground. As also apparent in FIG. 6, the set mole trap may be easily released manually simply by pressing outwardly on the upper end of the latch lever 55.

From the drawings and the above description, it is apparent that a mole trap constructed in accordance with the present invention provides desirable features and advantages. For example, the pair of springs 50 substantially increase the force which drives the spikes 45 into the ground to obtain quick and effective trapping of a mole. Also, the cocking mechanism 75 with the use of the strap 76 and the eccentrically supported roller 85 provides a mechanical advantage and substantially reduces the hand pulling force required to raise the spike plate 30 against the springs 50 to set the trap. The pivotal latch lever 55 and latch roller 74 further provide a sensitive release of the spike plate from its set position with only slight upward movement of the trip plate 65. The stop member or bar 22 limits downward movement of the spike plate 30 and also provides for preloading the springs 50. In addition, the impact of the spike plate 30 on the stop bar 22 when the spike plate is released assures that the lower end portions of the legs 14 remain within the ground after the spikes 45 penetrate the mole tunnel.

While the form of mole trap herein described constitutes a preferred embodiment of the invention, it is to be understood that the invention is not limited to this precise form of trap, and that changes may be made therein without departing from the scope and spirit of the invention as defined in the appended claims.

What is claimed is:

1. A mole trap comprising, an inverted U-shaped frame including parallel spaced vertical legs adapted to penetrate the ground and rigidly connected by a handle member, a spike plate supported by said legs for vertical movement between an upper set position and a lower released position, a plurality of parallel spaced elongated spikes having upper end portions secure to said spike plate for movement therewith and projecting downwardly parallel to said legs, a set of elongated helical coil compression springs with a compression spring surrounding each of said legs and biasing said spike plate and said spikes downwardly toward said released position, a releasable latch member securing an edge portion said spike plate outside the area encompassing said legs in said set position compressing said springs and connected to a trip member adapted to engage the ground to release said latch member in response to upward movement of said trip member, a hand operated cocking mechanism including a rotatable member supported by said spike plate for rotation between said legs on an axis and moveable vertically with said spike plate, an elongated flexible member extending around said rotatable member and having one end portion secured to said frame and a second end portion adapted to be gripped by a hand of an operator, and said cocking mechanism being operable to move said spike plate from said lower release position upwardly to said set position compressing said springs in response to an upward hand pulling force on said second end portion of said flexible member while holding downwardly on said handle member and with a hand pulling force substantially less than a force exerted by said springs on said spike plate.

2. A mole trap as defined in claim 1 wherein said frame comprises a metal rod with said legs integrally connected by a portion forming said handle member.

3. A mole trap as defined in claim 1 wherein said latch member comprises a generally L-shaped lever supported by said frame for pivotal movement on an axis adjacent one of said legs, said lever having an upwardly projecting leg portion supporting a latch roller adjacent said one of said legs and engaging an edge portion of said spike plate in said set position, and said lever having a lower leg portion projecting laterally inwardly between said legs and supporting said trip member.

4. A mole trap as defined in claim 3 wherein said trip member includes a trip plate pivotally connected to said lower leg portion of said lever.

5. A mole trap as defined in claim 1 wherein said frame includes a horizontal stop member rigidly connected to said legs and forming a positive stop for said spike plate in said released position.

6. A mole trap as defined in claim 1 wherein said handle member integrally connects said legs with said handle member extending perpendicular to said legs.

7. A mole trap as defined in claim 6 and including a handle cover member comprising a body of rigid plastics material and defining a cavity receiving said handle member of said frame, said flexible member comprising a flexible strap having said one end portion projecting into said cavity, and a plug projecting into said cavity and attached to said body to secure said one end portion of said strap to said body.

8. A mole trap as defined in claim 1 wherein said rotatable member has a curved outer surface, and said flexible member comprises a flexible strap extending partially around said surface.

9. A mole trap comprising,
   an inverted U-shaped frame including parallel spaced vertical legs adapted to penetrate the ground and rigidly connected by a handle member,
   a spike plate supported by said legs for vertical movement between an upper set position and a lower released position,
   a plurality of parallel spaced elongated spikes having upper end portions secure to said spike plate for movement therewith and projecting downwardly parallel to said legs,
   a set of elongated helical coil compression springs with a compression spring surrounding each of said legs and biasing said spike plate and said spikes downwardly toward said released position,
   a releasable latch member securing an edge portion of said spike plate outside the area encompassing said legs in said set position compressing said springs and connected to a trip member adapted to engage the ground to release said latch member in response to upward movement of said trip member,
   a hand operated cocking mechanism including a rotatable member having a curved outer surface and supported by said spike plate for vertical movement with said spike plate and for rotation between said legs on an axis eccentric to an axis of said curved outer surface,
   an elongated flexible member extending around and attached to said outer surface of said rotatable member and having one end portion secured to said handle portion of said frame and a second end portion adapted to be gripped by a hand of an operator, and
   said cocking mechanism being operable to move said spike plate from said lower release position upwardly to said set position compressing said springs in response to an upward hand pulling force on said second end portion of said flexible member while holding downwardly on said handle member and with a hand pulling force substantially less than a force exerted by said springs on said spike plate.

10. A mole trap as defined in claim 9 wherein said frame comprises a metal rod with said legs integrally connected by a portion forming said handle member.

11. A mole trap as defined in claim 9 wherein said latch member comprises a generally L-shaped lever supported by said frame for pivotal movement on an axis adjacent one of said legs, said lever having an upwardly projecting leg portion supporting a latch roller adjacent said one of said legs and engaging an edge portion of said spike plate in said set position, and said lever having a lower leg portion projecting laterally inwardly between said legs and supporting said trip member.

12. A mole trap as defined in claim 11 wherein said trip member includes a trip plate pivotally connected to said lower leg portion of said lever.

13. A mole trap as defined in claim 9 wherein said frame includes a horizontal stop member rigidly connected to said legs and forming a positive stop for said spike plate in said released position.

14. A mole trap as defined in claim 9 wherein said handle member integrally connects said legs with said handle member extending perpendicular to said legs.

15. A mole trap as defined in claim 14 and including a handle cover member comprising a body of rigid plastics material and defining a cavity receiving said handle member of said frame, said flexible member comprising a flexible strap having said one end portion projecting into said cavity, and a plug projecting into said cavity and attached to said body to secure said one end portion of said strap to said body.

16. A mole trap as defined in claim 9 wherein said rotatable member has a cylindrical said outer surface, and said flexible member comprises a flexible strap extending partially around said outer surface.

\* \* \* \* \*